United States Patent [19]
Wiessner

[11] 3,963,346
[45] June 15, 1976

[54] MICROFILM CAMERAS

[75] Inventor: Manfred Wiessner, Dresden, Germany

[73] Assignee: VEB Pentacon Dresden, Dresden, Germany

[22] Filed: Apr. 28, 1975

[21] Appl. No.: 572,462

[52] U.S. Cl. .................................. 355/73; 350/255; 352/222; 354/123; 354/203; 355/53
[51] Int. Cl.² ........................................ G03B 27/60
[58] Field of Search ........... 352/222; 354/203, 123; 355/45, 53, 54, 73, 78; 350/255

[56] References Cited
UNITED STATES PATENTS

| | | | |
|---|---|---|---|
| 3,094,036 | 6/1963 | Benson | 355/45 X |
| 3,295,407 | 1/1967 | Jeffree | 355/45 X |
| 3,433,564 | 3/1969 | Lahr | 355/76 |
| 3,525,291 | 8/1970 | Hakamata | 350/255 UX |
| 3,645,622 | 2/1972 | Cachon et al. | 355/78 X |

*Primary Examiner*—Richard A. Wintercorn
*Attorney, Agent, or Firm*—William A. Drucker

[57] ABSTRACT

A microfilm camera which includes a suction plate for holding a sheet of film. The suction plate is movable in steps across a picture gate. Between the objective lens and the contact surfaces of the picture gate there is a chamber formed at one end by a glass plate. The chamber is connected to a vacuum pump through a suction conduit. The suction conduit can be closed by a valve.

8 Claims, 4 Drawing Figures

MICROFILM CAMERAS

BACKGROUND TO THE INVENTION

The invention relates to a microfilm camera comprising a suction plate which is provided for holding a sheet of film and which can be moved in steps across a picture gate.

With this type of camera it is necessary, in order to achieve a high degree of picture sharpness, that the suction plate, which is movable parallel to the picture gate, should hold the front of the film sheet in the plane of the contact surfaces of the picture gate in every position of exposure.

However, this requirement cannot be fulfilled satisfactorily even with the smallest manufacturing tolerances.

In a known microfilm camera (British Patent No. 1,051,541) the roll film, which is movable in steps from a supply spool to a winding spool, can be sucked alternately by the suction chamber of the rear wall during each exposure process and by the suction chamber of the transporting plate during each film transport. Due to the fact that the film is sucked during the exposure process to the rear wall, the operator is forced to pay constant attention to changes in the thickness of the film that might occur. In a microfilm camera using sheet film, the complete release of the film sheet from the suction plate and its renewed suction furthermore involves the danger of the film sheet being displaced relative to the suction plate.

OBJECTS OF THE INVENTION

An object of the invention is to provide a camera with an improved picture sharpness whilst at the same time maintaining the adjusted position of the film sheet relative to the suction plate.

A further object of the invention is to provide a camera which ensures that the sheet of film rests evenly and completely on the picture gate during the actual exposure process.

SUMMARY OF THE INVENTION

According to the invention there is provided a microfilm camera comprising a picture gate having film contact surfaces, a suction plate for holding a sheet of film which can be moved in steps across the picture gate, an objective lens, a chamber formed between the objective lens and the contact surfaces of the picture gate, a glass plate forming one end of said chamber, a vacuum pump, a suction conduit connected between said chamber and said vacuum pump, and a valve for closing the path between said chamber and the pump.

Advantageously, the glass plate is arranged in the out-of-focus area of the objective lens, particularly in the plane of the focal point of the taking lens. Preferably the suction plate and the chamber are connected to a common vacuum pump and a suction current regulator is provided in at least one suction line. According to an advantageous embodiment, the suction plate is mounted so that it can be placed on or lifted off the picture gate, the valve being movable in dependence on these movements to an open position when the suction plate is placed on the picture gate and to a closed position when the suction plate is lifted from the picture gate. Due to the lifting and lowering of the suction plate, the valve can be operated electromagnetically by means of a control rod or by means of a switch. According to a further embodiment, the valve is operable by an electromagnet, which can be energised via a switch by a trip cam which is connected to the shutter leaf.

BRIEF DESCRIPTION OF THE DRAWINGS

The invention will be explained by way of example with reference to the accompanying drawings, in which.

DESCRIPTION OF PREFERRED EMBODIMENT

Figure 1:
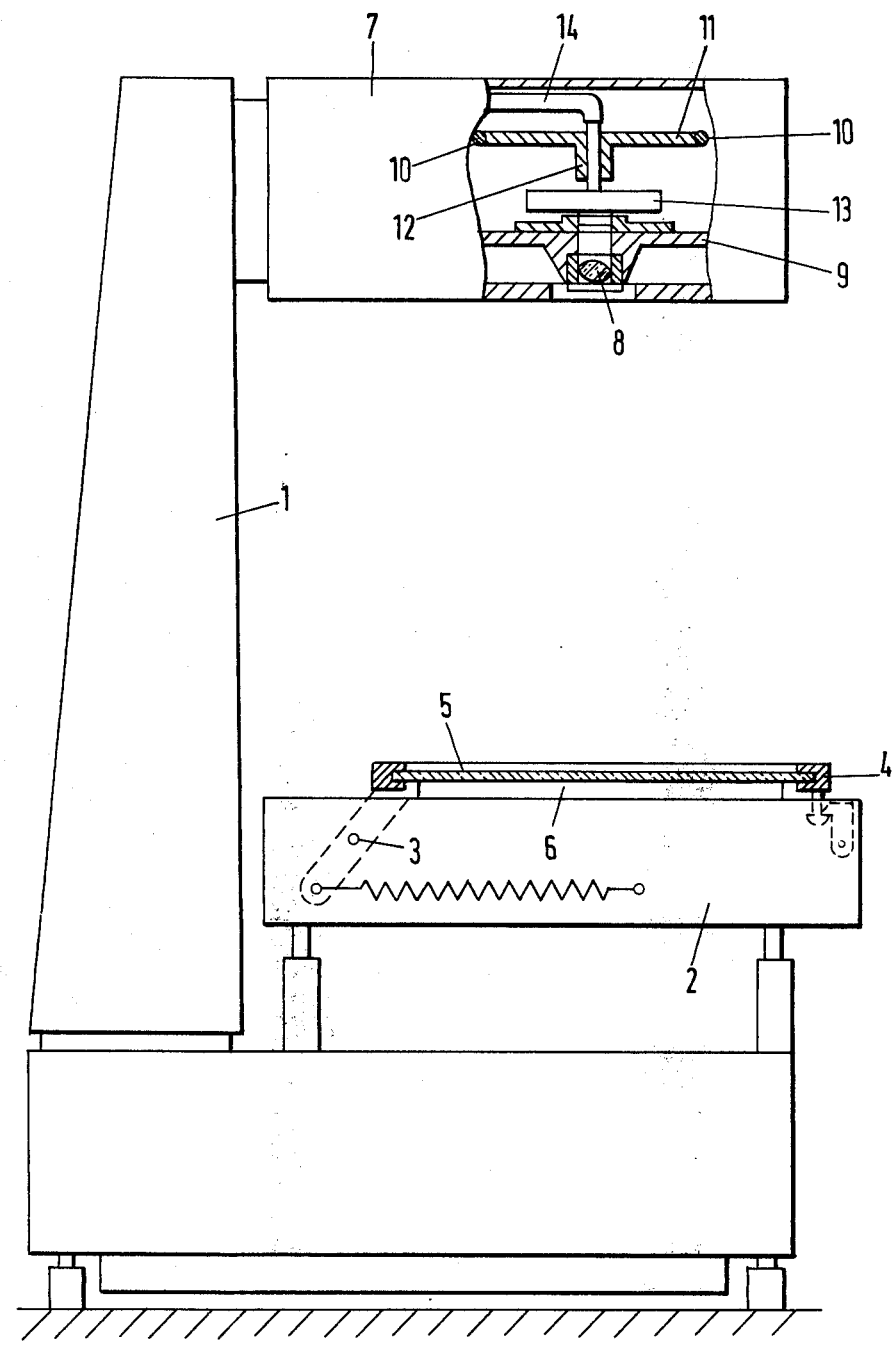
FIG. 1 shows a total view of the microfilm camera.

In the lower part of the camera mount 1 (see FIG. 1) the subject table 2 is arranged, in which a frame 4 is situated which is rotatable about the shaft 3. The surface of the subject 6 is held in the correct exposure plane by means of a glass plate 5, which is arranged in the frame 4.

In the upper part of the camera mount 1, there is the camera housing 7, in which the exposing lens (objective) 8 and the film gate are arranged. The slide 11 is movable in rods 10. The guide bushing 12, in which the suction plate 13 is guided in a liftable and lowerable manner, is connected to the slide 11. The suction plate 13 is connected via the hose 14 to a vacuum pump 15 (see FIG. 2), so that the sheet of film 16 is held on the suction apertures 17 of the suction plate 13 by means of suction.

Beneath the film trap 9 the glass plate 19 is arranged in the area of unsharpness, advantageously in the plane of the focal point of the objective 8. This glass plate 19 seals the chamber 20, which extends as far as the contact surface 18 of the picture gate 9, in an air-tight manner. This chamber 20 is in communication with the vacuum pump 15 via the conduit 21. The shutter blade 24, which is rotatable about the shaft 25, is also arranged in the area of unsharpness of the lens 8.

The suction current in the conduit 21 is adjustable by means of the regulating screw 22. The conduit 21 can be alternately opened and closed by the valve 23. The valve 23 is in communication with a control rod 26. The adjusting spring 27 endeavours to move the valve to the open position. Opposite to the guide rube 28 of the suction plate 13, the control rod 26 has a control plate 29, via which the control rod 26 can be operated in dependence on the lifting and lowering movement of the suction plate 13.

Figure 2:
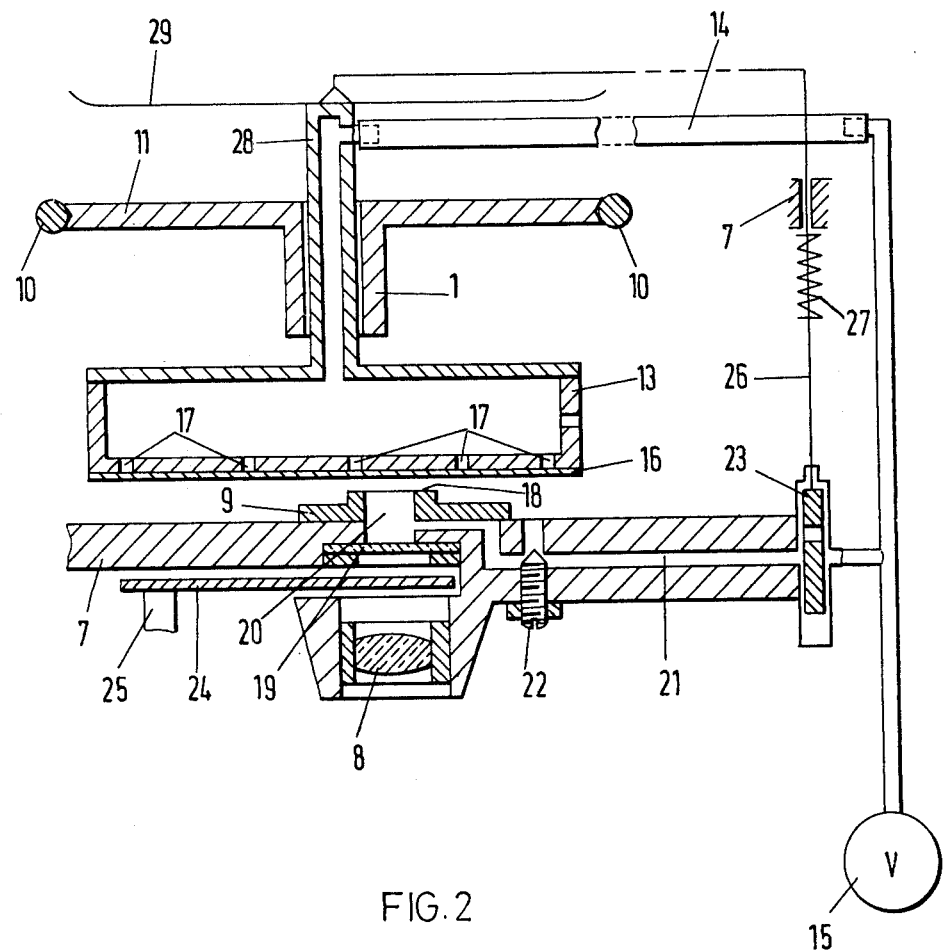
FIG. 2 shows a first embodiment according to the invention with the suction plate shown lifted from the picture gate.

The mode of operation of this arrangement is as follows:

In the position shown in FIG. 2, the suction plate 13 is lifted, together with the film sheet 16 held by the vacuum pump 15, from the contact surface 18 of the picture gate 9. In this lifted position, the suction plate 13 is moved by one picture step relative to the picture gate 9. During this process, the guide tube 28 slides along the control plate 29 of the control rod 26. The valve 23 is closed via the control rod 26 against the adjusting spring 271. As soon as the suction plate 13 is lowered onto the contact surface 18 of the picture gate 9 for the purpose of taking a photograph, the valve 23 is opened by the adjusting spring 27 and the chamber 20 is connected to the vacuum pump 15. By this means, the film sheet 16 is pulled all around onto the contact surface 18 of the picture gate 9. Upon a rotation of the shutter blade 24 about the shaft 25, a photograph is taken. When this photograph is completed, the suction plate 13 is lifted, together with the film sheet 16, for the purpose of carrying out a further film step, the valve 23 being closed against the adjusting spring 27 via the control plate 29 and the control rod 26 and the suction current thus being switched off in the chamber 20.

When the valve 23 is closed, the entire suction current produced by the vacuum pump 15 acts in the suction plate 13; when the valve 23 is opened, the suction stream is distributed by the regulating screw 22 in such a way that although the film sheet 16 is still held by the suction plate 13, it can be pulled from the suction plate 13 is the area of the contact surfaces 18 of the picture gate 9.

Figure 3:
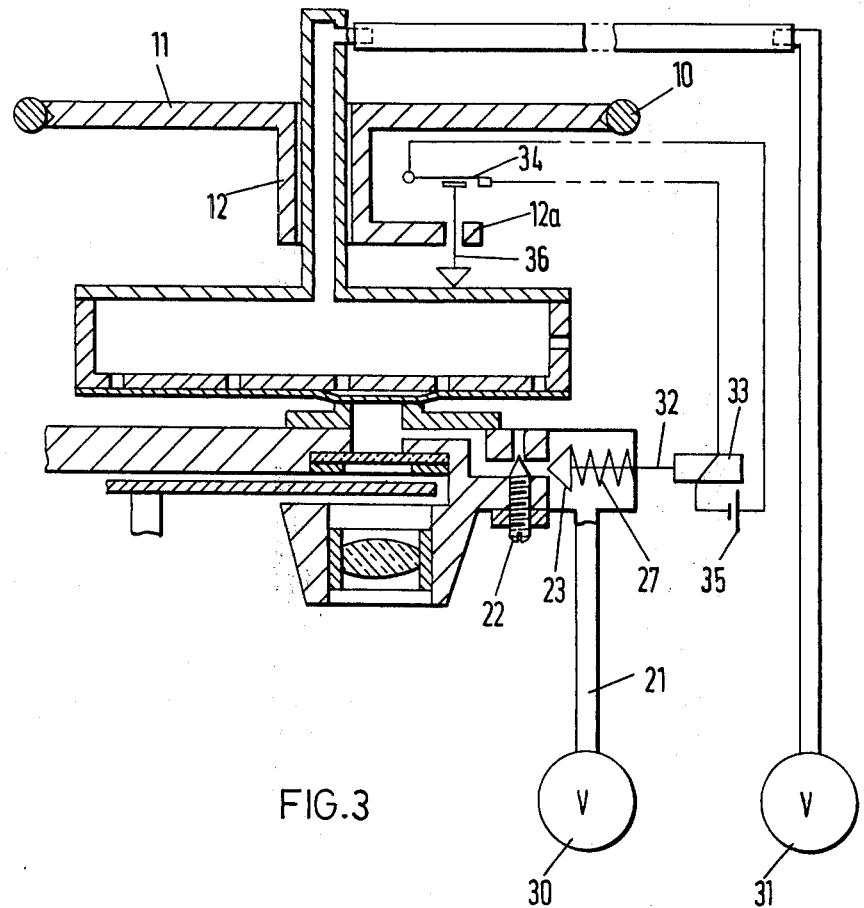
FIG. 3 shows a second embodiment according to the invention with the suction plate shown placed on the picture gate.

In the embodiment according to FIG. 3, the suction plate 13 is connected to the vacuum pump 31 via the hose 14, whilst the chamber 20 is joined to the further vacuum pump 30 via the line 21. The suction effect achieved in the chamber 20 by the vacuum pump 30 is stronger than that achieved in the suction plate 13 by the vacuum pump 31. The spring 27 attempts to keep the valve 23 in the closed position and is operatively connected with the electromagnet 33 via the control rod 32. The electromagnet 33 can be connected to the power source 35 via the switch 34. The switch 34 is operated by the trip pin 36, which is mounted in an axially movable manner opposite to the suction plate 13 on a bearing bracket 12a of the guide bushing 12.

In the position shown in FIG. 3, the suction plate 13 has been placed, together with the film sheet 16, on the contact surface 18 of the picture gate 9 for the purpose of taking a photograph. The switch 34 is closed by means of the trip pin 36 so that the electromagnet 33 holds the valve 23 in the open position against the spring 27. The film sheet 16 is sucked by the chamber 20 in the area of the contact surface 18 of the picture gate 9. As soon as the suction plate 13 is lifted, after the completion of a photograph, from the picture gate 9 for the purpose of carrying out a further transport step, the trip pin 36 opens the switch 34 so that the valve 23 is closed under the action of the spring 27.

Figure 4:
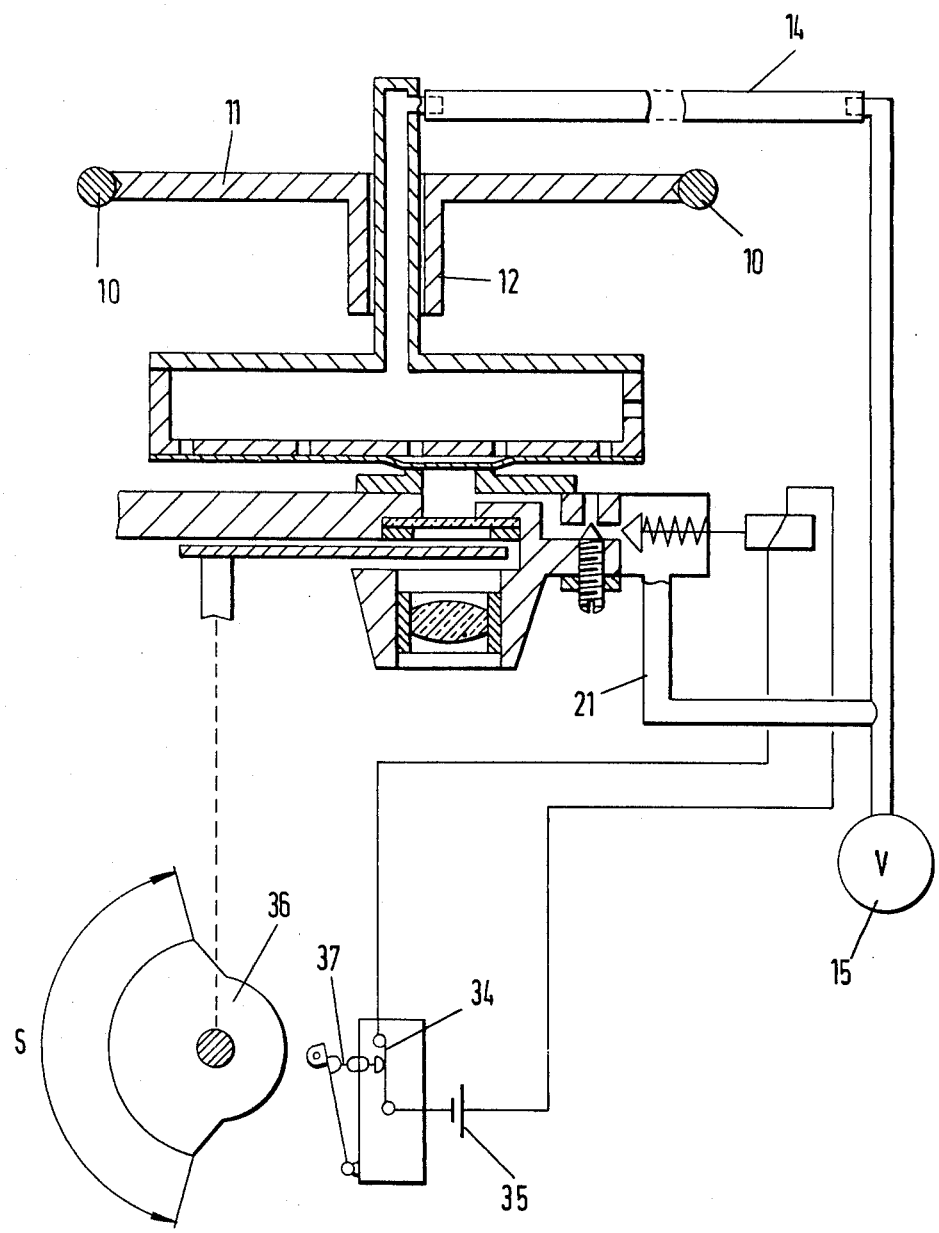
FIG. 4 shows a third embodiment of the invention with the suction plate shown lifted from the picture gate.

In the embodiment according to FIG. 4, the suction plate 13 is connected to the vacuum pump 15 via the hose 14 and the chamber 20 is connected to it via the line 21. The valve 23 provided in the line 21 is operable by the electromagnet 33, which can be connected to the power source 35 by means of the switch 34. A trip cam 36, which can operate the switch 34 by means of the trip pin 37, is fastened on the shaft 25 of the shutter blade 24. The cam length s is dimensioned in such a way that the switch 34 is closed shortly before the commencement of each photograph and is opened again immediately after completion of the photograph. The opening of the valve 23 occurs after the suction plate 13 has been placed on the picture gate 9, but before the picture ray path is released upon rotation of the shutter blade 24; the closing of the valve 23 thus occurs after the picture ray path has been closed by the shutter blade 24 but before the suction plate 13 lifts from the picture gate 9.

I claim:
1. A microfilm camera comprising:
   a. a picture gate having film contact surfaces,
   b. a suction plate for holding a sheet of film which can be moved in steps across the picture gate,
   c. an objective lens,
   d. a chamber formed between the objective lens and the contact surfaces of the picture gate,
   e. a glass plate forming one end of said chamber,
   f. a vacuum pump,
   g. a suction conduit connected between said chamber and said vacuum pump, and
   h. a valve for closing the path between said chamber and the pump.

2. A microfilm camera according to claim 1, wherein the glass plate is arranged in the area of unsharpness of the objective.

3. A microfilm camera according to claim 2, wherein the glass plate is arranged in the plane of the focal point of the objective.

4. A microfilm camera according to claim 1, wherein the suction plate and the chamber are connected to a common vacuum pump and that a suction current regulator is provided in at least one suction conduit.

5. A microfilm camera according to claim 1, wherein the suction plate is mounted so that it can be placed on the picture gate and can be lifted from the picture gate and that the valve can be moved, in dependence on these movements, to an open position when the suction plate is placed on the picture gate and to a closed position when the suction plate is lifted from the picture gate.

6. A microfilm camera according to claim 5, wherein the valve is operable by a control rod, which operatively connected with the suction plate.

7. A microfilm camera according to claim 5, wherein the valve is operable by an electromagnet, in a circuit containing a switch which can be actuated by a trip pin, operatively connected to the suction plate.

8. A microfilm camera according to claim 1, wherein the valve is operable by an electromagnet which can be energised via a switch by a trip cam connected to the shutter blade.

* * * * *